United States Patent
Lee

(10) Patent No.: US 9,152,188 B2
(45) Date of Patent: Oct. 6, 2015

(54) ATTACHMENT MECHANISM FOR FASTENING EXPANSION CARD

(71) Applicant: HON HAI PRECISION INDUSTRY CO., LTD., New Taipei (KR)

(72) Inventor: Chia-Chen Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 208 days.

(21) Appl. No.: 14/018,423

(22) Filed: Sep. 5, 2013

(65) Prior Publication Data

US 2014/0313646 A1    Oct. 23, 2014

(51) Int. Cl.
*H05K 7/20* (2006.01)
*G06F 1/18* (2006.01)

(52) U.S. Cl.
CPC ....................................... *G06F 1/185* (2013.01)

(58) Field of Classification Search
CPC ....................................................... G06F 1/186
USPC .............................................................. 361/801
See application file for complete search history.

(56) References Cited

U.S. PATENT DOCUMENTS

| | | | | |
|---|---|---|---|---|
| 5,317,483 | A * | 5/1994 | Swindler | 361/801 |
| 5,650,917 | A * | 7/1997 | Hsu | 361/759 |
| 5,909,359 | A * | 6/1999 | Summers et al. | 361/748 |
| 6,324,065 | B1 * | 11/2001 | Nelson et al. | 361/754 |
| 6,419,517 | B1 * | 7/2002 | Moden | 439/377 |
| 6,738,261 | B2 * | 5/2004 | Vier et al. | 361/740 |
| 6,807,052 | B2 * | 10/2004 | Erickson et al. | 361/679.02 |
| 7,035,117 | B2 * | 4/2006 | Chen et al. | 361/801 |
| 7,684,210 | B2 * | 3/2010 | Kosugi et al. | 361/801 |
| 8,625,294 | B2 * | 1/2014 | Zhang et al. | 361/759 |

* cited by examiner

*Primary Examiner* — Anthony Q Edwards
(74) *Attorney, Agent, or Firm* — Novak Druce Connolly Bove + Quigg LLP

(57) ABSTRACT

An attachment mechanism for fastening an expansion card includes a bracket and a bar. The bracket is fastened to a first end of the expansion card. The bar abuts a side of the expansion card adjoining the first end, and is fastened to both of the first end of the expansion card and a second end of the expansion card opposite to the first end.

17 Claims, 3 Drawing Sheets

ATTACHMENT MECHANISM FOR FASTENING EXPANSION CARD

BACKGROUND

1. Technical Field

The present disclosure relates to an attachment mechanism for fastening an expansion card to an enclosure.

2. Description of Related Art

An expansion card contains a number of electronic components to extend functions. Accordingly, the expansion card becomes heavy. When an end of the expansion card is fastened to an enclosure, an opposite end of the expansion card is easily deformed.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one."

Figure 1:
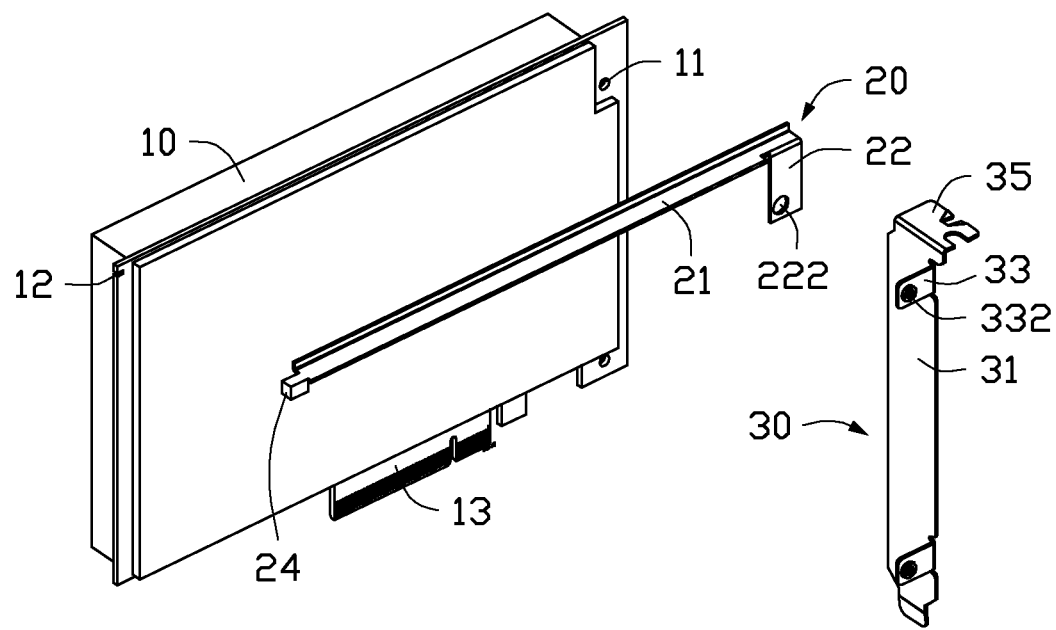
FIG. 1 is an exploded, isometric view of an exemplary embodiment of an attachment mechanism together with an expansion card, wherein the attachment mechanism includes a bar.

FIG. 1 shows an exemplary embodiment of an attachment mechanism for fastening an expansion card 10. The attachment mechanism includes a bar 20 and a bracket 30.

Two through holes 11 are defined in a first end of the expansion card 10, arranged up and down. A notch 12 is defined in a second end of the expansion card 10 opposite to the first end, near a top of the expansion card 10. A connection portion 13 is formed on a bottom of the expansion card 10, to electrically connect to a circuit board.

Figure 2:
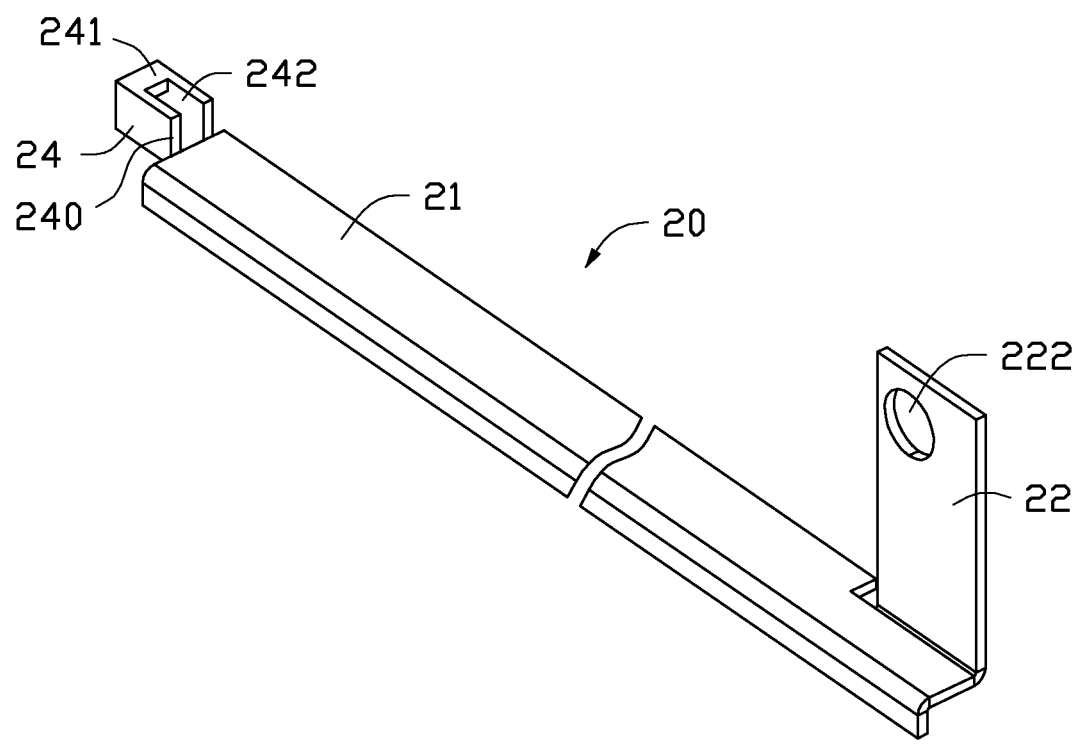
FIG. 2 is an inverted view of the bar of FIG. 1.

FIG. 2 shows the bar 20 including a long main body 21, a fastening tab 22 extending down from a first end of the main body 21, and a block 24 extending down from a second end of the main body 21. The fastening tab 22 defines a through hole 222. The block 24 includes a sidewall 240 facing the main body 21, and a bottom wall 241 adjoining the sidewall 240. A latching slot 242 is defined in the block 24, extending through the bottom wall 241 and the sidewall 240.

The bracket 30 includes a long base body 31, two mounting tabs 33 perpendicularly extending from a side of the base body 31, and an end wall 35 extending from a top end of the base body 31 and opposite to the mounting tabs 33. The mounting tabs 33 are arranged up and down. Each mounting tab 33 defines a locking hole 332.

Figure 3:
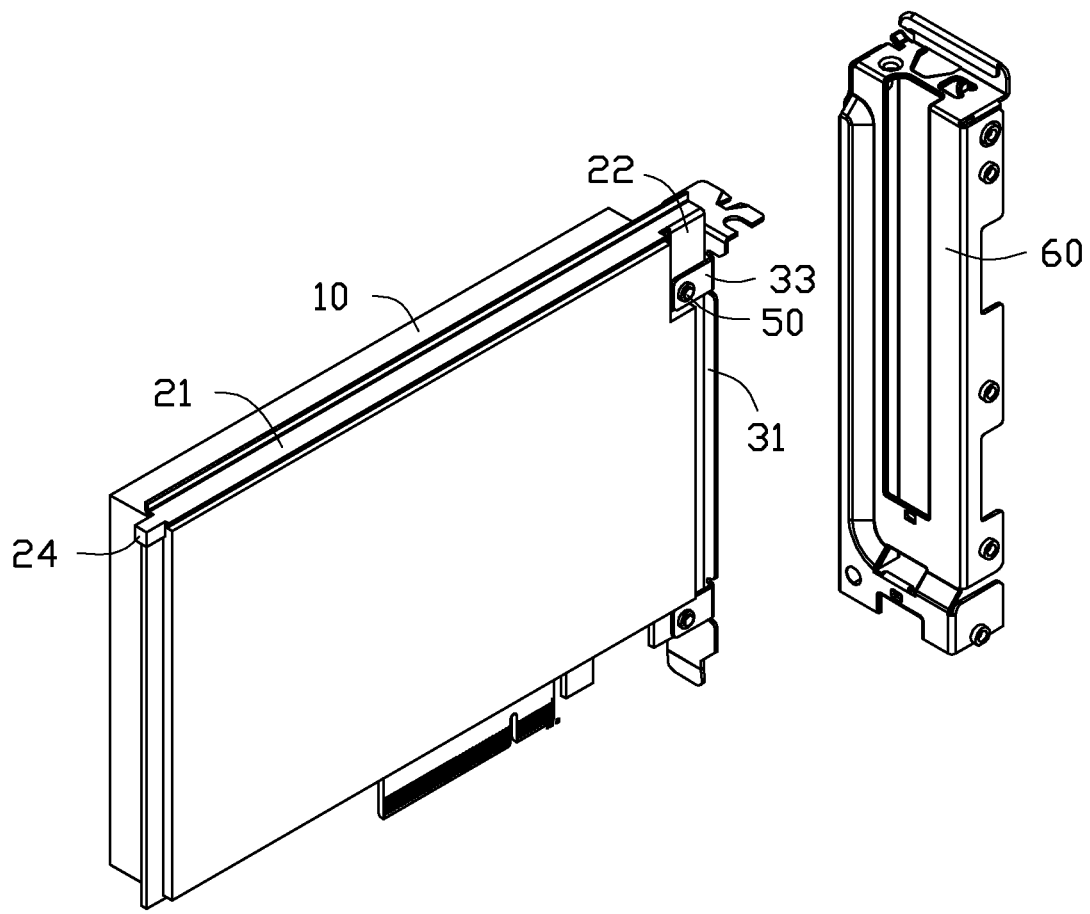
FIG. 3 is an assembled, isometric view of FIG. 1.

FIG. 3 shows that in assembly the main body 21 abuts the top of the expansion card 10. A top of the second end of the expansion card 10 engages in the latching slot 242 of the block 24, and the bottom wall 241 engages in the notch 12. The through hole 222 aligns with the upper through hole 11. The locking holes 332 of the bracket 30 are aligned with the through holes 11. The fastening tab 22 is sandwiched between the expansion card 10 and the upper mounting tab 33. A fastener 50, such as a screw, extends through the upper through hole 11 and the through hole 222, and engages in the upper locking hole 332, to fasten the attachment mechanism to the expansion card 10. The base body 31 is perpendicular to the main body 21. The end wall 35 can be fastened to an enclosure 60 parallel to the base body 31.

The bar 20 is attached to both of the first and second ends of the expansion card 10, thereby alleviating deformation of the expansion card 10.

Even though numerous characteristics and advantages of the embodiments have been set forth in the foregoing description, together with details of the structure and the functions of the embodiments, the disclosure is illustrative only, and changes may be made in details, especially in the matters of shape, size, and arrangement of parts within the principles of the embodiments to the full extent indicated by the broad general meaning of the terms in which the appended claims are expressed.

What is claimed is:

1. An attachment mechanism for fastening an expansion card, comprising:
    a bracket to be fastened to a first end of the expansion card; and
    a bar abutting a side of the expansion card adjoining the first end, and to be fastened to both of the first end of the expansion card and a second end of the expansion card opposite to the first end.

2. The attachment mechanism of claim 1, wherein the bar comprises a main body to abut the side of the expansion card, a fastening tab extending from a first end of the main body to be fastened to the first end of the expansion card, and a block extending from a second end of the main body to be fastened to the second end of the expansion card.

3. The attachment mechanism of claim 2, wherein the bracket comprises a mounting tab, the fastening tab is fastened between the mounting tab and the expansion card.

4. The attachment mechanism of claim 3, wherein the bracket further comprises a base body perpendicular to the main body, the mounting tab extends from the base body.

5. The attachment mechanism of claim 3, wherein the fastening tab defines a first through hole, the mounting tab defines a locking hole, a fastener extends through a second through hole defined in the expansion card and the first through hole, and engages in the locking hole.

6. The attachment mechanism of claim 2, wherein a latching slot is defined in the block, the second end of the expansion card engages in the latching slot.

7. The attachment mechanism of claim 6, wherein the block includes a sidewall facing the main body, and a bottom wall adjoining the sidewall, the latching slot extends through the sidewall and the bottom wall.

8. The attachment mechanism of claim 7, wherein the bottom wall engages in a notch defined in the second end of the expansion card.

9. An assembly, comprising:
    an expansion card;
    an enclosure;
    a bracket fastened to a first end of the expansion card and the enclosure; and
    a bar abutting a side of the expansion card adjoining the first end, and fastened to both of the first end of the expansion card and a second end of the expansion card opposite to the first end.

10. The assembly of claim 9, wherein the bar comprises a main body to abut the side of the expansion card, a fastening tab extending from a first end of the main body to be fastened to the first end of the expansion card, and a block extending from a second end of the main body to be fastened to the second end of the expansion card.

11. The assembly of claim 10, wherein the bracket comprises a mounting tab, the fastening tab is fastened between the mounting tab and the expansion card.

12. The assembly of claim 11, wherein the bracket further comprises a base body perpendicular to the main body, the mounting tab extends from the base body.

13. The assembly of claim 12, wherein the base body is parallel to the enclosure, an end wall extends from the base body and is fastened to the enclosure.

14. The assembly of claim 11, wherein the fastening tab defines a first through hole, the expansion card defines a second through hole, the mounting tab defines a locking hole, a fastener extends through the second through hole and the first through hole, and engages in the locking hole.

15. The assembly of claim 10, wherein a latching slot is defined in the block, the second end of the expansion card engages in the latching slot.

16. The assembly of claim 15, wherein the block includes a sidewall facing the main body, and a bottom wall adjoining the sidewall, the latching slot extends through the sidewall and the bottom wall.

17. The assembly of claim 16, wherein a notch is defined in the second end of the expansion card, the bottom wall engages in the notch.

* * * * *